Feb. 25, 1941. W. MARTINO 2,232,882
RECEPTACLE HOLDER OR CLAMP
Filed Dec. 27, 1938 2 Sheets-Sheet 1
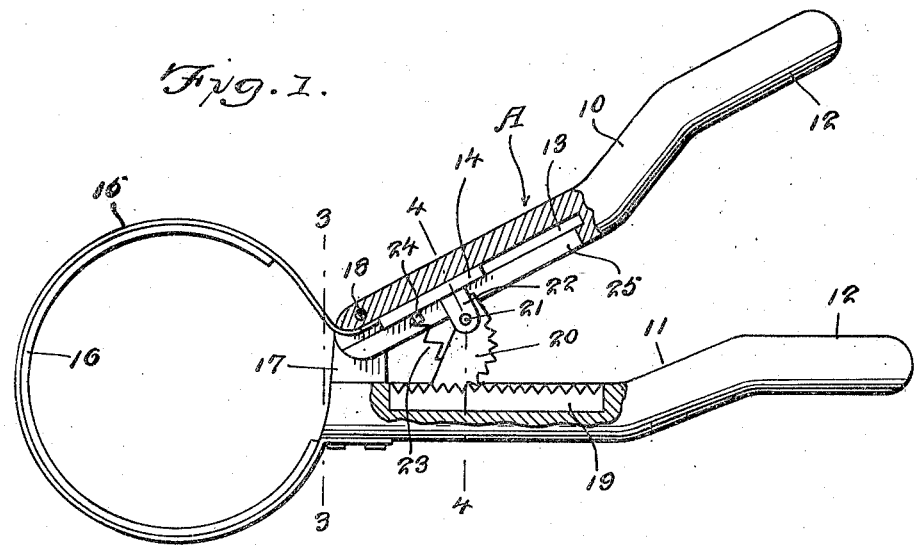
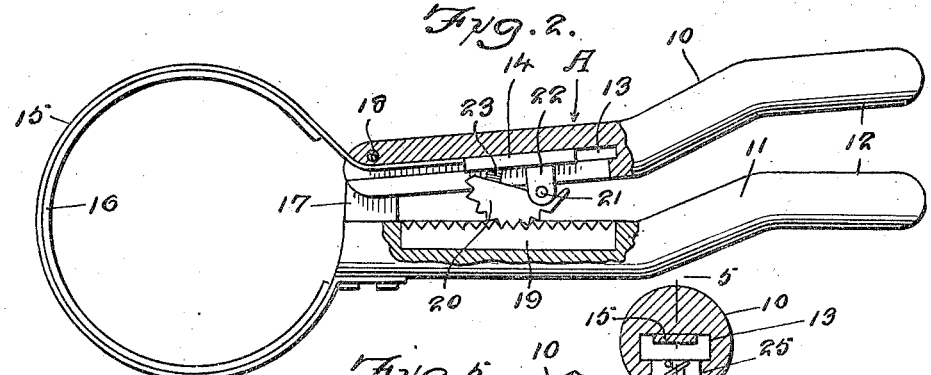
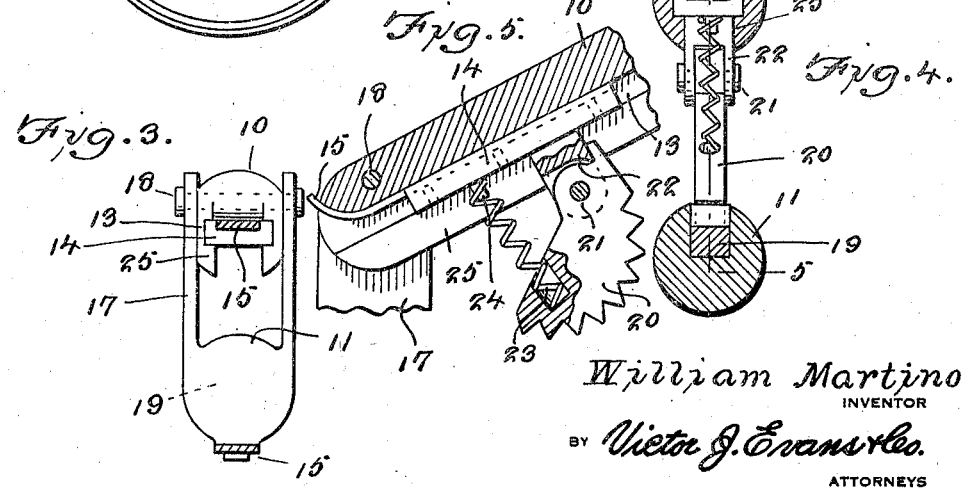
William Martino
INVENTOR
BY Victor J. Evans & Co.
ATTORNEYS

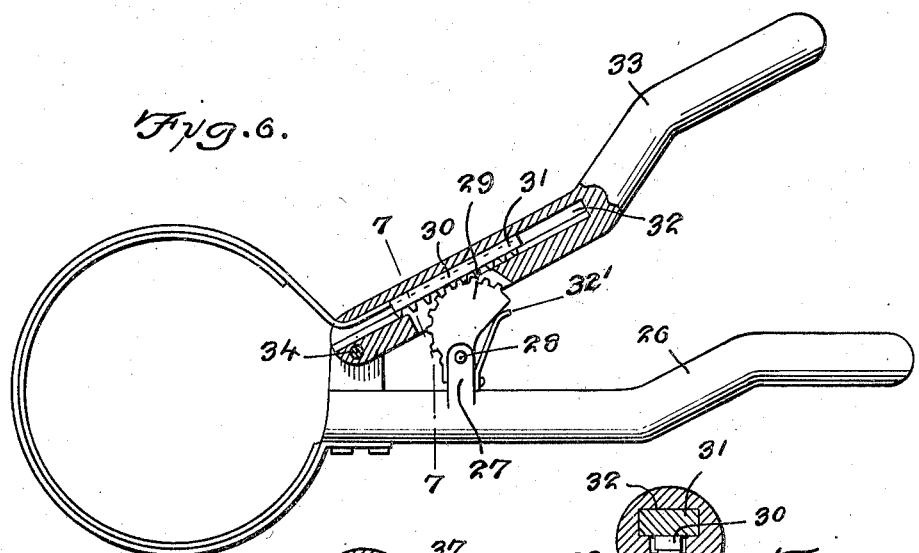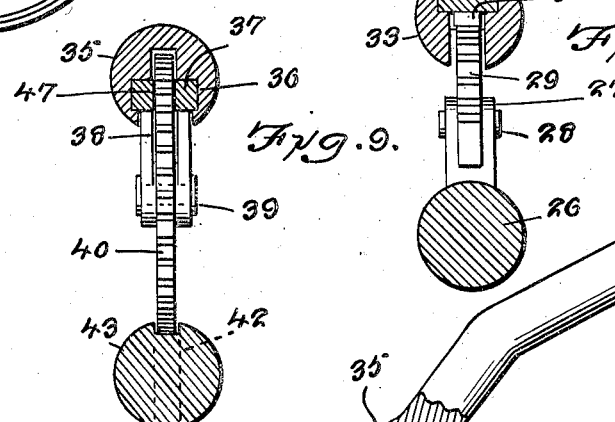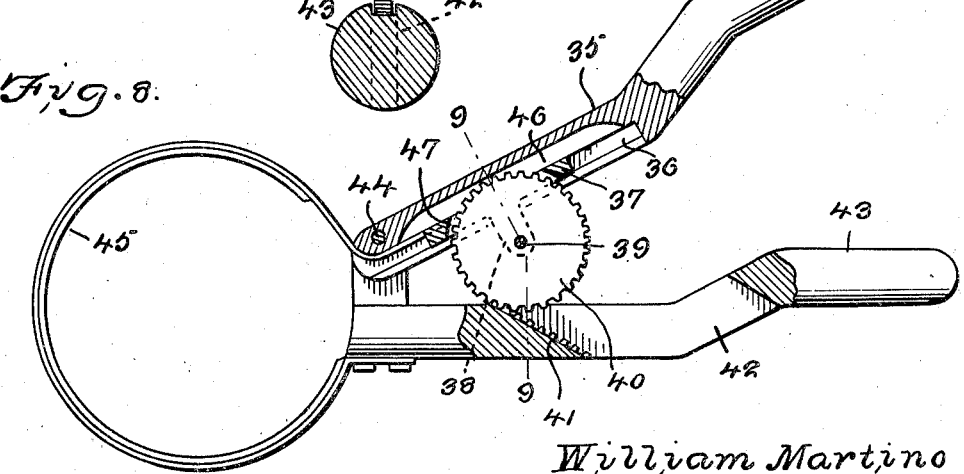

Patented Feb. 25, 1941

2,232,882

UNITED STATES PATENT OFFICE 2,232,882

RECEPTACLE HOLDER OR CLAMP

William Martino, Detroit, Mich.

Application December 27, 1938, Serial No. 247,897

4 Claims. (Cl. 81—3.1)

The invention relates to a receptacle holder or clamp and more especially to an adjustable jar, bottle or can holder.

The primary object of the invention is the provision of a holder of this character, wherein a receptacle such as a can, jar, bottle or the like can be firmly gripped when placed within a steaming apparatus or hot water for sterilizing so that there will be no liability of the user becoming burned or injured while handling such receptacle.

Another object of the invention is the provision of a holder of this character, wherein the same is readily adjustable to be applied to receptacles of different sizes and when so applied will firmly grip the receptacle for the convenient handling thereof, the holder being also adapted for easy removal of screw caps or covers to jars, cans or the like.

A further object of the invention is the provision of a holder of this character, wherein the construction thereof is novel in its make-up so that the same can be readily operated for the gripping and holding of a jar, bottle, can or the like whereby the latter may be held for the placing thereof within a sterilizing apparatus and removed with dispatch and ease.

A still further object of the invention is the provision of a holder of this character, which is simple in construction, thoroughly reliable and effective in operation, self-adjusting, assuring a firm and positive grip upon a receptacle for the easy handling thereof, strong, durable, and inexpensive to manufacture.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claims hereunto appended.

In the accompanying drawings:

Figure 1 is a plan view partly in section of a holder constructed in accordance with the invention, being shown in open or non-clamping position.

Figure 2 is a view similar to Figure 1 showing the holder in a closed or clamping position.

Figure 3 is an enlarged sectional view taken on the line 3—3 of Figure 1.

Figure 4 is a sectional view on the line 4—4 of Figure 1.

Figure 5 is a sectional view on the line 5—5 of Figure 4.

Figure 6 is a view similar to Figure 1 showing a slight modification.

Figure 7 is a sectional view on the line 7—7 of Figure 6.

Figure 8 is a view similar to Figure 6 showing a further modification.

Figure 9 is a sectional view on the line 9—9 of Figure 8.

Similar reference characters indicate corresponding parts throughout the several views in the drawings.

Referring to the drawings in detail, particularly Figures 1 to 5, inclusive, the holder A comprises a pair of handle bars 10 and 11, respectively, these having straight portions and remaining laterally offset handle portions, the latter being identified at 12.

The handle bar 10 is formed in the straight portion thereof with a longitudinal guideway 13 for a slide 14 to which is connected one end of a flexible expansible and contractible loop-like clamping strap or band 15, preferably of metal, one end of the latter being joined with the straight portion of the handle bar 11 while on the inner face of this strap or band 15 is a protective lining 16 which throughout its extent has contact with the outer surface of a receptacle, such as a jar, bottle, can or the like when the strap or band 15 is trained or placed about the same for the clamping thereof in a manner presently described.

The straight portion of the handle bar 11 next to the band or strap 15 has carried thereon a pivot bracket 17 fitted with a pivot 18 swingingly connecting the straight portion of the handle bar 10 with relation to the handle bar 11.

Countersunk within the straight portion of the handle bar 11 is a toothed rack 19 engageable with a segmental toothed rack gear 20 eccentrically pivoted at 21 to a bearing 22 on the slide 14. The rack gear 20 has counterseated therein and acting against the same a coil compression spring 23 of light tension and having fixed relation to the slide 14 by a retaining pin 24. The purpose of the spring 23 is to maintain meshing engagement between the said gear 20 and the companion rack 19 therefor.

In the use of the holder before described, the band 15 in its extended or expanded position will loosely encircle a receptacle and in this position being placed over the latter in a convenient manner so that when the handle bars 10 and 11 are manually gripped and pressure applied to have the bar 10 approach the bar 11, the rack gear 20 meshing with the rack 19 forces the slide 14 in the guideway 13 in the direction of the handle 12 of the handle bar 10 and in this way the band or strap 15 is contracted and brought into clamping condition about the receptacle so that it will be firmly held and can be conveniently handled when placing the receptacle in a sterilizing apparatus or the removal of such receptacle therefrom without the liability of the user of the holder becoming burned or otherwise injured. The holder is manually operated, being gripped by the hand of a user and through manipulation of the handle bars 10 and 11 can be brought to a clamping position or may be released from a receptacle in the use of the holder.

The straight portion of the handle bar 10 following the guideway 13 is provided with a clearance 25 for the bearing 22 on the slide 14, the latter being readily movable in the guideway 13 and is operated by the toothed rack 19 and pinion 20 meshing therewith. It is possible to swing the handle bar 10 in a direction for the disengagement of the gear 20 from the rack 19 and the slide 14 in this instance will freely play in the guideway 13 for hand adjustment, either for the expanding or contracting of the strap or band 15.

In Figures 6 and 7 of the drawings there is shown a slight modification wherein the handle bar 26 is formed with a bearing 27 carrying a pivot 28 swingingly connecting thereto a segmental rack gear 29 meshing with a rack 30 formed with the slide 31. This gear 29 has acting against the same a leaf spring 32 for maintaining meshing engagement of the gear 29 with the rack 30 on the slide 31. The slide 31 moves in a guideway 32 provided in the handle bar 33, which is swingable toward or away from the handle bar 26, being pivoted at 34.

In Figures 8 and 9 of the drawings there is shown a further modification of the invention wherein the handle bar 35 in its guideway 36 carries a slide 37 which is movable in the guideway 36 and is formed with a bearing 38 carrying an axle 39 for a cog or toothed rack wheel 40. This cog or toothed rack wheel 40 meshes with a toothed rack 41 companion thereto and formed in a cutaway portion 42 provided in the handle bar 43. The bar 35 is pivoted at 44 for swinging movement toward and away from the bar 43 and under such movement the wheel 40 coacts with the companion toothed rack 41 so that the slide 37 will be moved in the guideway 36 and in this way the strap or band 45 is extended or contracted for clamping and unclamping action thereof with respect to a receptacle and when clamping such receptacle the latter can be firmly held for the purposes hereinbefore stated.

The handle bar 35 has augmenting the guideway 36 a clearance 46 for the wheel 40 while the slide 37 is slotted at 47 for accommodating the wheel 40 in the rotatable mounting thereof on the axle 39 and the bearing 38.

The handle bars of the holder, when manually operated for movement of one bar toward the other, effect the mechanical driving of the slide, which transfers the movement thereof to the strap or band of the holder for bringing such strap or band into clamping engagement with a receptacle when the said strap or band is about this receptacle.

The lining 16, hereinbefore mentioned, is for preventing the band or strap of the holder from damaging the receptacle on the clamping of the latter by the holder in the use of the same.

The springs 23 and 32, respectively, are of light tension and function to maintain meshing engagement between the rack and the rack gear or wheel.

What is claimed is:

1. A holder of the kind described, comprising a flexible expanding and contracting band, a pair of handle bars pivotally connected to each other for swinging movement with respect to each other, a slide movably fitting on the inside of one of the bars and having fixed connection with one end of said band, means for securing the other end of the band to the other bar, and a gear and rack connection between said slide and the other handle and actuated by the inward movement of said other handle bar for shifting the slide to expand and contract said band.

2. A holder of the kind described, comprising a pair of pivotally connected handle bars, a slide movably fitting one handle bar, a looplike flexible band having one end fixed to the slide and the other end fixed to one of the handle bars, and co-acting means having connection with one of the handle bars and the said slide for operating the latter when one handle bar is moved relative to the other to effect expansion and contraction of the said band.

3. The combination as claimed in claim 2 including a rack and gear forming parts of the last-named means.

4. A holder of the kind described, comprising a flexible expanding and contracting band, a pair of handle bars pivotally connected to each other for swinging movement with respect to each other, a slide movably fitting on the inside of one of the bars and having fixed connection with one end of said band, means securing the other end of the band to the other bar, a gear and rack connection between said slide and the other handle bar and actuated by said other handle bar for shifting of the slide to expand and contract said band, and means for maintaining the gear and rack in engagement in operated position.

WILLIAM MARTINO.